(12) United States Patent
Kremen (10) Patent No.: US 11,930,114 B1
(45) Date of Patent: Mar. 12, 2024

(54) MESSAGE ENCRYPTION THROUGH IDENTIFICATION OF A SEQUENTIAL PRIME NUMBER

(71) Applicant: Thomas Michael Kremen, Dublin, CA (US)

(72) Inventor: Thomas Michael Kremen, Dublin, CA (US)

( * ) Notice: Subject to any disclaimer, the term of this patent is extended or adjusted under 35 U.S.C. 154(b) by 0 days.

(21) Appl. No.: 18/364,004

(22) Filed: Aug. 2, 2023

(51) Int. Cl.
*H04L 9/00* (2022.01)
*H04L 9/14* (2006.01)
*H04L 9/30* (2006.01)

(52) U.S. Cl.
CPC .............. *H04L 9/3033* (2013.01); *H04L 9/14* (2013.01); *H04L 9/302* (2013.01)

(58) Field of Classification Search
CPC .......... H04L 9/3033; H04L 9/14; H04L 9/302
See application file for complete search history.

(56) References Cited

U.S. PATENT DOCUMENTS

| 8,509,429 B2* | 8/2013 | Cuypers | H04L 63/1441 726/26 |
| 2007/0100982 A1* | 5/2007 | Jayaraman | H04L 43/0817 709/223 |
| 2017/0257211 A1* | 9/2017 | Vigilant | H04L 9/302 |

* cited by examiner

*Primary Examiner* — Ghazal B Shehni (57) ABSTRACT

This disclosure describes providing message encryption through identification of sequential prime numbers. Encryption keys are generated, where a public encryption key is generated based on determining a lowest addend value to add to a starting value to produce a next sequential prime number with respect to the starting value. The public encryption key is provided to a computing device, and the computing device can use the public encryption key to encrypt a message. The encrypted message is received from the computing device and decrypted using a private key of the encryption keys that are generated.

20 Claims, 5 Drawing Sheets

| Prime number $P_i$ | Quotient of $Q / P_i$ | First modulus $R_i$ | First difference value $D_i$ |
|---|---|---|---|
| 3 | 251 | 0 | 3 |
| 5 | 150 | 3 | 2 |
| 7 | 107 | 4 | 3 |
| 11 | 68 | 5 | 6 |
| 13 | 57 | 12 | 1 |
| 17 | 44 | 5 | 12 |
| 19 | 39 | 12 | 7 |
| 23 | 32 | 17 | 6 |

350

| Prime number $P_i$ | Quotient of $Q / P_i$ | First modulus $R_i$ | First difference value $D_i$ |
|---|---|---|---|
| 13 | 57 | 12 | 1 |
| 5 | 150 | 3 | 2 |
| 3 | 251 | 0 | 3 |
| 7 | 107 | 4 | 3 |
| 11 | 68 | 5 | 6 |
| 23 | 32 | 17 | 6 |
| 19 | 39 | 12 | 7 |
| 17 | 44 | 5 | 12 |

MESSAGE ENCRYPTION THROUGH IDENTIFICATION OF A SEQUENTIAL PRIME NUMBER

BACKGROUND

The use of prime numbers in cryptography is known to provide superior encryption over the use of composite numbers because products of prime numbers are more difficult to factorize. For example, the process of factorizing a product of two prime numbers into its components is computationally intensive and thus a more secure approach for encryption. In cryptography, the prime numbers used are hundreds of digits long, making factorizing incredibly difficult, even for supercomputers.

There are many still unknown prime numbers, although there are many techniques for finding prime numbers. For example, prime numbers can be found using the Sieve of Eratosthenes, Mersenne's formula for prime numbers, Pocklington-Lehmer primality test, the Miller-Rabin primality test, or simply the resource-intensive trial-and-error method of dividing a candidate number by prime numbers to determine if the candidate number is evenly divisible by only the number one and itself. However, these techniques are deficient in many ways. In some cases, these techniques only allow for testing whether a number is prime and does not provide a way to identify a prime number at the outset. In other cases where a prime number can be identified, such as in the case of Mersenne prime numbers, there are existing prime numbers that still cannot be determined using those techniques. As prime numbers are integral components of effective cryptography, the finding of unknown prime numbers significantly enhances the strength of encryption techniques. As computing resources become ever more powerful, the need to identify previously unknown prime numbers is essential for preventing encrypted communications from being easily decrypted.

BRIEF DESCRIPTION OF THE DRAWINGS

Various embodiments will be described and explained with additional specificity and detail through the use of the accompanying drawings in which.

DETAILED DESCRIPTION

This disclosure describes one or more embodiments of message encryption through identification of a sequential prime number. In particular, in some implementations, the message encryption system can receive, obtain, or access a message to be encrypted, and in response, the message encryption system can encrypt the message using a public key. The public key is part of a generated set of encryption keys to be used to encrypt and decrypt the message. The generated set of encryption keys includes a public encryption key that is generated based on a starting value. The starting value can be any value generated by the system or received as an input to the system (e.g., from a user or from another system). The public encryption key that is generated is based on the next sequential prime number subsequent to the starting value. The public encryption key in the set of encryption keys is used to encrypt the message. In some examples, the technique of identifying a prime number based on a starting value can be used any number of times based on any number of starting values to generate any number of prime numbers that can be used to generate a public encryption key of the set of encryption keys. These techniques can also be used to generate the corresponding private key of the set of keys. The generated public key is provided to the message encryption system such that the message encryption system can encrypt the message and send the encrypted message securely to the recipient device. The recipient device can decrypt the encrypted message using the private key of the set of encryption keys.

A public encryption key is based on the next sequential prime number subsequent to the starting value and can be generated by identifying a set of prime numbers less than the starting value. For each prime number in the set of prime numbers identified, a first modulus is calculated using the starting value and the respective prime number. Additionally, for each prime number in the set of prime numbers identified, a first difference value between the respective prime number and the respective first modulus is calculated to generate a set of first difference values corresponding to the set of prime numbers. A lowest addend value based on the set of first difference values is identified such that for each respective prime number, a second modulus does not equal zero, where the second modulus is based on a second difference value between the lowest addend value and the respective first difference value, and the respective prime number. Based on these calculations, the public encryption key can be determined based on the starting value and the lowest addend value.

The described message encryption system provides a variety of technical advantages relative to existing encryption techniques. For example, existing encryption techniques rely on using known prime numbers as public keys in RSA encryption. However, there are a limited number of known prime numbers due to existing techniques that only allow for identification of a subset of prime numbers, and while RSA encryption is fairly secure, the limitation of using known prime numbers makes it possible to decrypt content. The techniques described herein solve this problem by allowing for the identification of the next sequential prime number subsequent to a starting value, making it possible for all prime numbers to be identified and used for encryption, unlike prior techniques that leave a subset of prime numbers undiscovered. Having access to all prime numbers results in enhanced encryption security, as the possible set of prime numbers that can be used in encryption becomes endless.

Furthermore, calculations for determining a prime number to use to generate a public encryption key are cumbersome and resource-intensive, particularly for large prime numbers, because these techniques require multiple calculations of which several may result in simply identifying that a candidate number is not a prime number. As candidate prime numbers become larger, the number of tests using these existing techniques also becomes larger, and an exponentially larger quantity of computing resources are wasted on unsuccessful outcomes (e.g., determining that a candidate number is not prime). The techniques described herein allow for the affirmative identification of a prime number based on a starting number using minimal computing resources by eliminating the need for resource-intensive calculations that merely identify whether a candidate number is not a prime number (e.g., unsuccessful primality testing of candidate prime numbers experienced by other prime number identification methods), efficiently providing stronger encryption of content using a fraction of the computational resources required of existing techniques.

Figure 1:
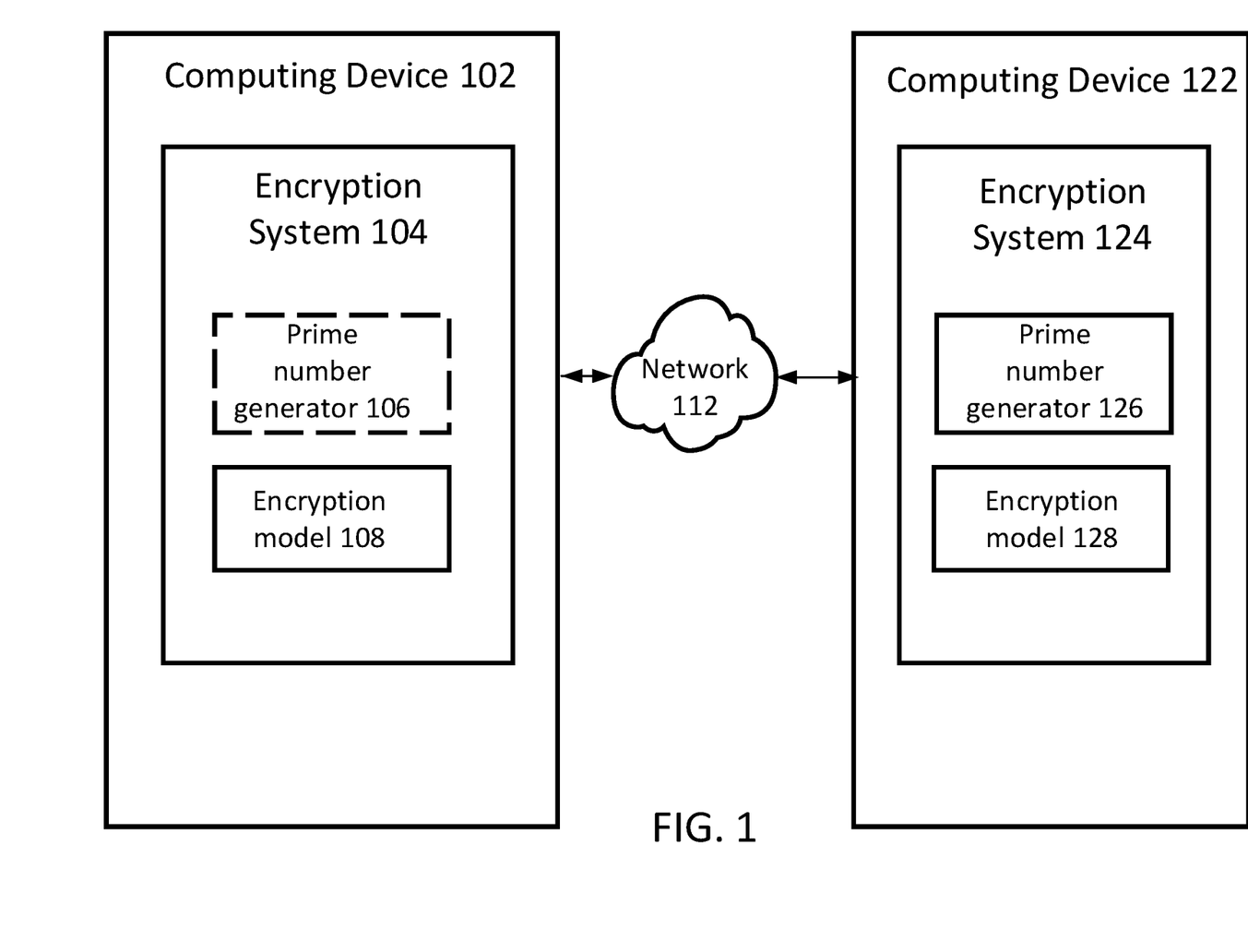
FIG. 1 illustrates an example diagram of an environment in which message encryption through sequential prime number identification operates, in accordance with one or more implementations.

Turning now to the figures, FIG. 1 illustrates an example diagram of an environment in which message encryption through sequential prime number identification operates in accordance with one or more implementations. An overview of the encryption system 104 and the encryption system 124 are described in relation to FIG. 1. Thereafter, a more detailed description of the components and processes of the encryption system 104 and the encryption system 124 is provided in relation to the figures.

As shown, the environment includes computing device 102, computing device 122, and a network 112. Each of the components of the environment can communicate via the network 112, and the network 112 may be any suitable network over which computing devices can communicate. Example networks are discussed in more detail below in relation to FIG. 4.

As mentioned above, the example environment includes computing device 102 and computing device 122. The computing device 102 and/or the computing device 122 can be any one of a variety of computing devices, including a smartphone, a tablet, a smart television, a desktop computer, a laptop computer, a virtual reality device, an augmented reality device, a server device, or another computing device as described in relation to FIG. 4. The computing device 102 can communicate with computing device 122 via the network 112, and vice versa. For example, the computing device 102 can receive or access a message to be encrypted, encrypt the message using encryption system 104, and send the encrypted message via the network 112 to computing device 122 for decryption using the encryption system 124.

As shown, the computing device 102 can include the encryption system 104. The encryption system 104 can encrypt and/or decrypt content. In particular, the encryption system 104 includes an encryption model 108. The encryption model 108 uses a public encryption key to encrypt the message received or accessed by the computing device 102. The public encryption key can be generated by the encryption model 128 of encryption system 124. The encryption model 108 can use any type of encryption scheme. In some examples, RSA encryption is used by the encryption model 108 to encrypt the message based on the public encryption key generated by the encryption model 128 of encryption system 124.

Computing device 122 includes the encryption system 124. The encryption system 124 can encrypt and/or decrypt content. In particular, the encryption system 124 includes a prime number generator 126 and an encryption model 128. The prime number generator 126 can generate any number of prime numbers using the techniques described in more detail below in relation to FIG. 2B. The encryption model 128 uses the prime number(s) to generate the public encryption key used by computing device 102 to encrypt the message. The encryption model 128 also uses the prime number(s) to generate a corresponding private encryption key to decrypt the message encrypted using the public key.

For example, when computing device 122 receives an encrypted message from computing device 102, the encryption system 124 of computing device 122 decrypts the message using the encryption model 128, which can be any type of decryption scheme based on the encrypted message. For example, the encryption system 124 may access the private key associated with the encrypted message received to decrypt the message.

While FIG. 1 is described with the encryption occurring using encryption system 104 and the decryption occurring using encryption system 124, one of ordinary skill in the art will appreciate that encryption and decryption can happen in either system. For example, the encryption can occur in the system that generates the set of encryption keys (e.g., digital signature standard (DSS) encryption), or the encryption can occur in the system that receives the public key from another system that generates the set of encryption keys as described above.

In some examples, encryption system 104 can also include a prime number generator 106, which functions similarly to prime number generator 126. For example, encryption model 108 can use prime number generator 106 to create a set of encryption keys (e.g., a public key and a private key) for encrypting content.

Figure 2A:
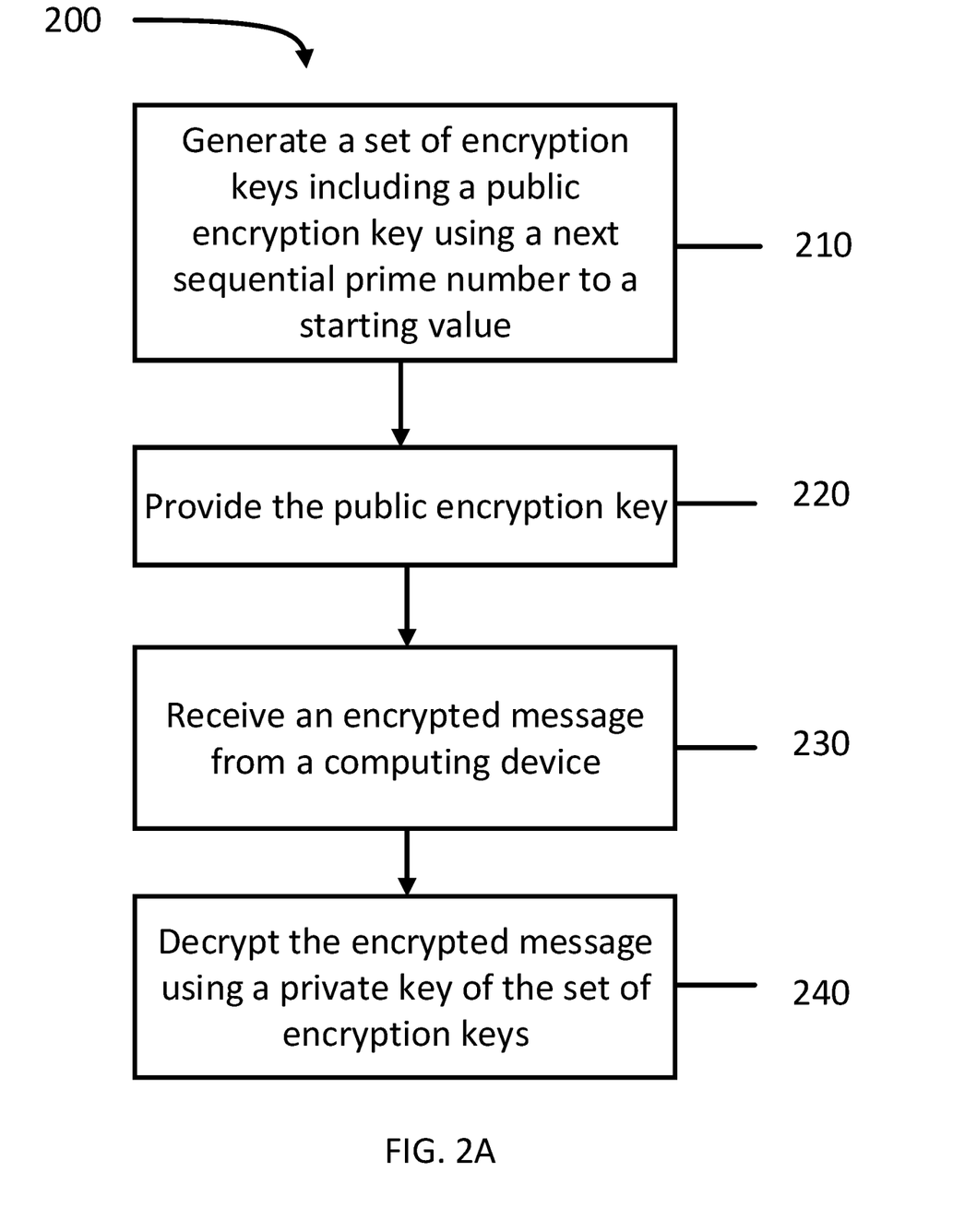
FIG. 2A illustrates a flowchart of a series of acts for encrypting and decrypting a message through identification of a sequential prime number, in accordance with one or more implementations.

FIG. 2A illustrates a flowchart of a series of acts for encrypting and decrypting a message through identification of a sequential prime number in accordance with one or more implementations. While FIG. 2A illustrates acts according to one embodiment, alternative embodiments may omit, add to, reorder, and/or modify any of the acts shown in FIG. 2A. The acts of FIG. 2A can be performed as part of a method. Alternatively, a non-transitory computer-readable medium can comprise instructions that, when executed by one or more processors, cause a computing device to perform the acts of FIG. 2A. In some embodiments, a system can perform the acts of FIG. 2A.

As shown in FIG. 2A, the series of acts 200 include an act 210 of generating a set of encryption keys including a public encryption key using a next sequential prime number to a starting value, an act 220 of providing the public encryption key, an act 230 of receiving an encrypted message from a computing device, and an act 240 of decrypting the encrypted message using a private key of the set of encryption keys.

In particular, the act 210 can include generating a set of encryption keys including a public encryption key using a next sequential prime number to a starting value. The set of encryption keys can also include a corresponding private encryption key. The public encryption key as well as the corresponding private encryption key are generated using the method shown in FIG. 3, which will be described in more detail below. The set of encryption keys generated can be based on any number of prime numbers that are generated based on the method shown in FIG. 3. In some examples, the set of encryption keys is generated by encryption system 124.

The starting value used to generate the public encryption key can be any starting value that is provided in any manner. For example, the starting value can be a value generated by encryption system 124, a value provided by a user, or a value provided by another system.

The public encryption key of the generated set of encryption keys can be used to generate a private key for a message to be encrypted using the set of encryption keys. The private key can be used to decrypt the message encrypted using the set of encryption keys.

The act 220 can include providing the public encryption key. For example, the public encryption key can be provided to any computing device, and that computing device can use the public encryption key to encrypt a message. The message can be encrypted using any encryption technique, such as RSA encryption.

The act 230 can include receiving an encrypted message from a computing device, where the computing device encrypted the message using the public encryption key provided.

The act 240 can include decrypting the encrypted message using the private key of the set of encryption keys.

Figure 2B:
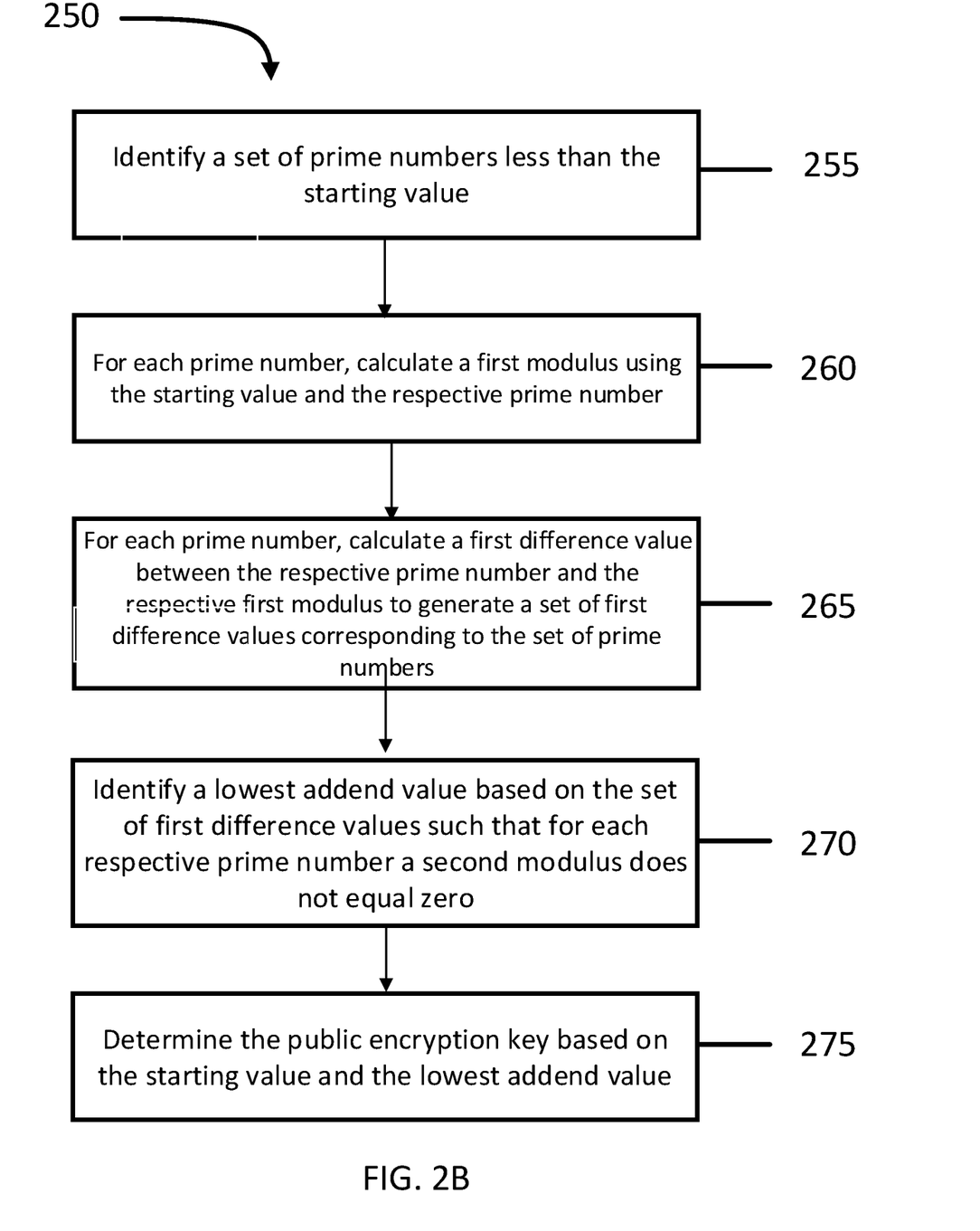
FIG. 2B illustrates a flowchart of a series of acts for identifying a sequential prime number to be used in message encryption, in accordance with one or more implementations.

FIG. 2B illustrates a flowchart of a series of acts for identifying a sequential prime number to be used in message encryption in accordance with one or more implementations. While FIG. 2B illustrates acts according to one embodiment, alternative embodiments may omit, add to, reorder, and/or modify any of the acts shown in FIG. 2B. The acts of FIG. 2B can be performed as part of a method. Alternatively, a non-transitory computer-readable medium can comprise instructions that, when executed by one or more processors, cause a computing device to perform the acts of FIG. 2B. In some embodiments, a system can perform the acts of FIG. 2B.

As shown in FIG. 2B, the series of acts 250 include: an act 255 of identifying a set of prime numbers less than the starting value; an act 260 of, for each prime number, calculating a first modulus using the starting value and the respective prime number; an act 265 of, for each prime number, calculating a first difference value between the respective prime number and the respective first modulus to generate a set of first difference values corresponding to the set of prime numbers; an act 270 of identifying a lowest addend value based on the set of first difference values such that for each respective prime number a second modulus does not equal zero; and an act 275 of determining the public encryption key based on the starting value and the lowest addend value.

In particular, the act 255 can include identifying a set of prime numbers less than the starting value Q. In some examples, the set of prime numbers identified is the set of prime numbers that are less than a square root of the starting value Q.

The act 260 can include, for each prime number $P_i$ in the set of prime numbers, calculating a first modulus $R_i$ using the starting value Q and the respective prime number $P_i$. The respective prime number $P_i$ is used as a divisor and the starting value Q is used as a dividend to calculate the resulting first modulus $R_i$ (i.e., remainder) for the respective prime number $P_i$. In some examples, this process is performed for the set of prime numbers identified. In other examples, the process can be performed for only a subset of the set of prime numbers identified.

The act 265 can include, for each prime number $P_i$ in the set of prime numbers, calculating a first difference value $D_i$ between the respective prime number $P_i$ and the respective first modulus $R_i$ (e.g., $D_i=P_i-R_i$) to generate a set of first difference values corresponding to the set of prime numbers.

Figure 3:
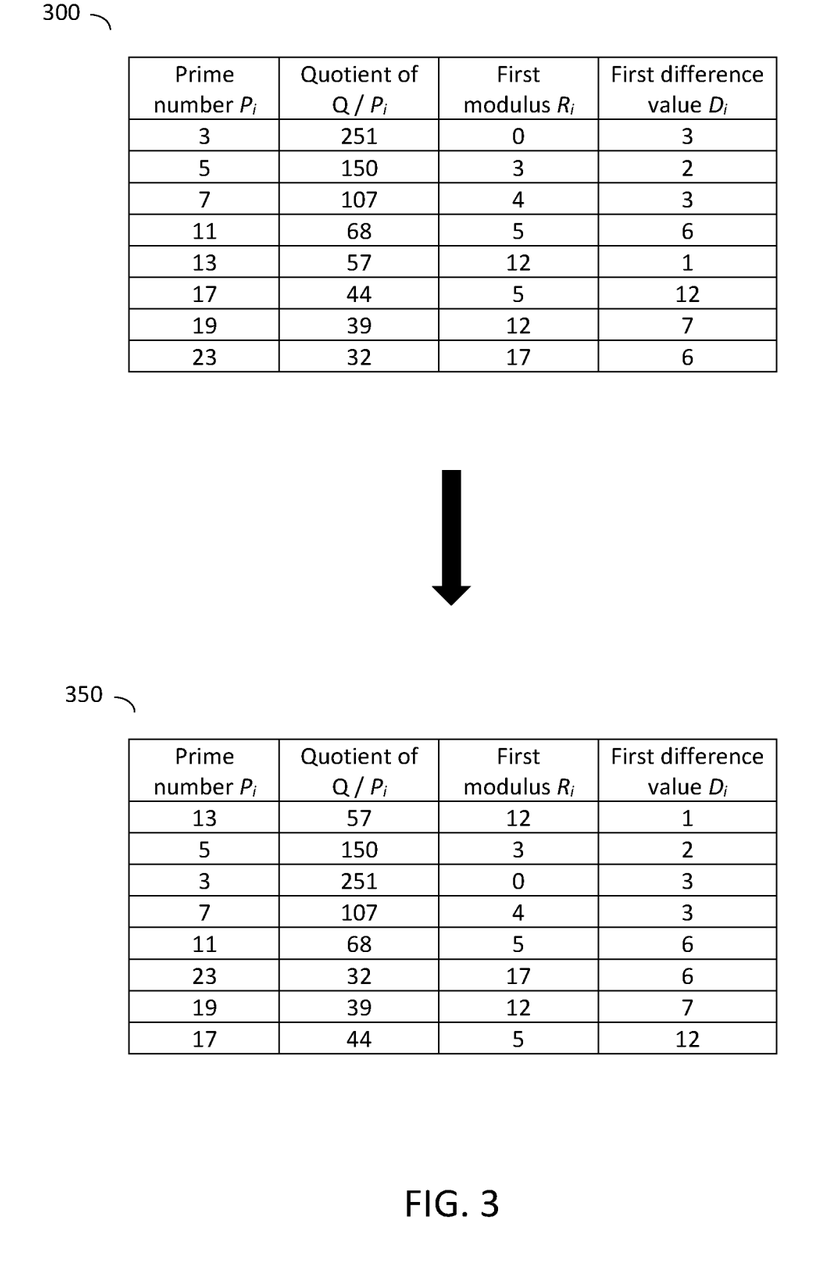
FIG. 3 illustrates an example table for identifying a sequential prime number relative to a starting value, in accordance with one or more implementations.

In some examples, a table for identifying a sequential prime number relative to a starting value Q can be created with the set of first difference values corresponding to the set of prime numbers. FIG. 3 illustrates an example table 300 for identifying a sequential prime number relative to a starting value in accordance with one or more implementations. FIG. 3 shows an example of a table 300 that can be created based on the calculations of act 255, act 260, and act 265, where the starting value is 753. The table 300 shows a subset of the set of prime numbers that is less than the starting value 753 (e.g., prime numbers up to the square root of 753). The table 300 also shows the quotient and the modulus $R_i$ for each prime number $P_i$ as a divisor of the starting value Q=753 as the dividend. The table 300 further shows a first difference value $D_i$ for each corresponding prime number $P_i$.

Referring back to FIG. 2B, the act 270 can include identifying a lowest addend value N based on the set of first difference values $D_i$ such that for each respective prime number $P_i$ a second modulus does not equal zero. The second modulus is based on the respective prime number $P_i$ and a second difference value between the lowest addend value N and the respective first difference value $D_i$. The lowest addend value N is the lowest value that is not found in the set of first difference values that results in the second modulus not equaling zero (e.g., $(N-D_i) \bmod P_i \neq 0$). Based on the lowest addend value N that is identified, the second modulus is calculated for each respective prime number and respective first difference value combination, and if none of the second moduli calculated equals zero, that lowest addend value N identified is the addend value that will result in the next sequential prime number subsequent to the starting value Q.

In some examples, identifying the lowest addend value includes generating a database table sorted by the set of first difference values, the database table including a respective prime number $P_i$ associated with each first difference value $D_i$ in the set of first difference values. The sorted table is used to sequentially search the first difference values $D_i$ for the lowest addend value N that results in the second modulus not equaling zero.

Referring back to FIG. 3, a table 350 shows a sorted database table based on sorting table 300 by the first difference value $D_i$. The table 350 can be used to identify the lowest addend value N. For example, based on the starting value Q=753, the $D_i$ values of sorted table 350 can be sequentially searched to identify the lowest addend value N that is not found in the set of first difference values $D_i$ that results in the second modulus not equaling zero. In the example of FIG. 3, the lowest $D_i$ value not found in the set of first difference values is 4. When performing the calculation to determine if the second modulus does not equal zero, each respective $P_i$ and $D_i$ combination is tested to determine that $(N-D_i) \bmod P_i \neq 0$. When testing N=4 for each respective $P_i$ and $D_i$ combination, each of the second moduli calculated does not equal zero. As such, N=4 is the lowest addend value for a starting value of 753.

The act 275 can include determining the public encryption key based on the starting value and the lowest addend value. The public encryption key is determined to be the sum of the starting value and the lowest addend value, which would result in the next sequential prime number subsequent to the starting value. Based on the example shown in FIG. 3, the first public encryption key would be 757 (753+4), which is the next prime number subsequent to the starting value 753.

Figure 4:
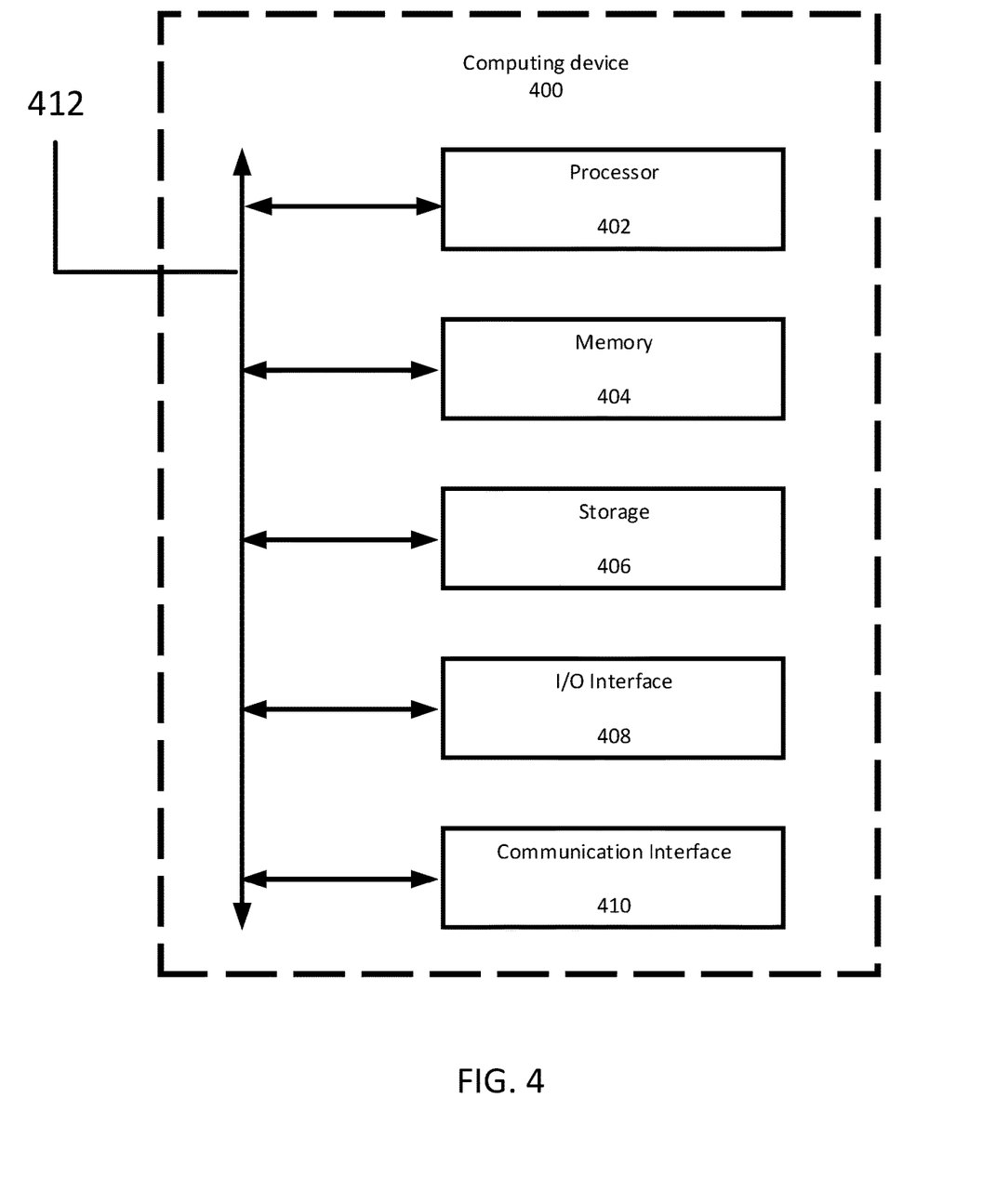
FIG. 4 illustrates a block diagram of a computing device, in accordance with one or more embodiments.

FIG. 4 illustrates a block diagram of example computing device 400 that may be configured to perform one or more of the processes described above. One will appreciate that computing devices described herein may comprise one or more computing devices such as computing device 400. As shown by FIG. 4, computing device 400 can comprise processor 402, memory 404, storage device 406, I/O interface 408, and communication interface 410, which may be communicatively coupled by way of communication infrastructure 412. While an example computing device 400 is shown in FIG. 4, the components illustrated in FIG. 4 are not intended to be limiting. Additional or alternative components may be used in other embodiments. Furthermore, in certain embodiments, computing device 400 can include fewer components than those shown in FIG. 4. Components of computing device 400 shown in FIG. 4 will now be described in additional detail.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage device 406 and decode and execute them. In particular embodiments, processor 402 may include one or more internal caches for data, instructions, or addresses. As an example and not by way of limitation, processor 402 may include one or more instruction caches, one or more data caches, and one or more translation lookaside buffers (TLBs). Instructions in the instruction caches may be copies of instructions in memory 404 or storage 406.

Memory 404 may be used for storing data, metadata, and programs for execution by the processor(s). Memory 404 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 404 may be internal or distributed memory.

Storage device 406 includes storage for storing data or instructions. As an example and not by way of limitation, storage device 406 can comprise a non-transitory storage medium described above. Storage device 406 may include a hard disk drive (HDD), a floppy disk drive, flash memory, an optical disc, a magneto-optical disc, magnetic tape, or a Universal Serial Bus (USB) drive or a combination of two or more of these. Storage device 406 may include removable or non-removable (or fixed) media, where appropriate. Storage device 406 may be internal or external to computing device 400. In particular embodiments, storage device 406 is non-volatile, solid-state memory. In other embodiments, storage device 406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 408 allows a user to provide input to, receive output from, and otherwise transfer data to and receive data from computing device 400. I/O interface 408 may include a mouse, a keypad or a keyboard, a touch screen, a camera, an optical scanner, network interface, modem, other known I/O devices or a combination of such I/O interfaces. I/O interface 408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 408 is configured to provide graphical data to a display for presentation to a user. The graphical data may be representative of one or more graphical user interfaces and/or any other graphical content as may serve a particular implementation.

Communication interface 410 can include hardware, software, or both. In any event, communication interface 410 can provide one or more interfaces for communication (such as, for example, packet-based communication) between computing device 400 and one or more other computing devices or networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 410 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 410 may facilitate various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 412 may include hardware, software, or both that couples components of computing device 400 to each other. As an example and not by way of limitation, communication infrastructure 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific example embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
    generate a set of encryption keys, wherein a public encryption key of the set of encryption keys is generated by:
        identifying a set of prime numbers less than a starting value;
        for each prime number in the set of prime numbers, calculating a first modulus using the starting value and the respective prime number;
        for each prime number in the set of prime numbers, calculating a first difference value between the respective prime number and the respective first modulus to generate a set of first difference values corresponding to the set of prime numbers;
        identifying a lowest addend value based on the set of first difference values such that for each respective prime number a second modulus does not equal zero, wherein the second modulus is based on:
            a second difference value between the lowest addend value and the respective first difference value, and
            the respective prime number; and
        determining the public encryption key based on the starting value and the lowest addend value;
    provide the public encryption key to another computing device;
    receive an encrypted message from the other computing device, wherein the encrypted message is encrypted using the public encryption key provided; and
    decrypt the encrypted message using a private encryption key of the set of encryption keys.

2. The non-transitory computer-readable storage medium as recited in claim 1, further comprising instructions that, when executed by the at least one processor, cause the computing device to:
    generate the private encryption key based on the public encryption key.

3. The non-transitory computer-readable storage medium as recited in claim 1, wherein the private encryption key is based on a next sequential prime number with respect to the starting value.

4. The non-transitory computer-readable storage medium as recited in claim 1, wherein the encrypted message is based on RSA encryption.

5. The non-transitory computer-readable storage medium as recited in claim 1, wherein the public encryption key is based on a next sequential prime number with respect to the starting value.

6. The non-transitory computer-readable storage medium as recited in claim 1, wherein the set of prime numbers is less than a square root of the starting value.

7. The non-transitory computer-readable storage medium as recited in claim 1, wherein identifying the lowest addend value includes generating a database table sorted by the set of first difference values, the database table including a respective prime number associated with each first difference value in the set of first difference values.

8. A computer-implemented method of encryption, comprising:
    generating, by a first computing device, a set of encryption keys, wherein a public encryption key of the set of encryption keys is generated by:
        identifying a set of prime numbers less than a starting value;
        for each prime number in the set of prime numbers, calculating a first modulus using the starting value and the respective prime number;
        for each prime number in the set of prime numbers, calculating a first difference value between the respective prime number and the respective first modulus to generate a set of first difference values corresponding to the set of prime numbers;
        identifying a lowest addend value based on the set of first difference values such that for each respective prime number a second modulus does not equal zero, wherein the second modulus is based on:
            a second difference value between the lowest addend value and the respective first difference value, and
            the respective prime number; and
        determining the public encryption key based on the starting value and the lowest addend value;
    providing, by the first computing device over a network, the public encryption key to a second computing device;
    receiving, by the first computing device over the network, an encrypted message from the other computing device, wherein the encrypted message is encrypted using the public encryption key; and
    decrypting, by the first computing device, the encrypted message using a private encryption key of the set of encryption keys.

9. The method of claim 8, further comprising:
    generating, by the first computing device, the private encryption key based on the public encryption key.

10. The method of claim 1, wherein the private encryption key is based on a next sequential prime number with respect to the starting value.

11. The method of claim 8, wherein the encrypted message is based on RSA encryption.

12. The method of claim 8, wherein the public encryption key is based on a next sequential prime number with respect to the starting value.

13. The method of claim 8, wherein the set of prime numbers is less than a square root of the starting value.

14. The method of claim 8, wherein identifying the lowest addend value includes generating a database table sorted by the set of first difference values, the database table including a respective prime number associated with each first difference value in the set of first difference values.

15. A system, comprising:
    at least one processor; and
    at least one non-transitory computer-readable storage medium comprising instructions that, when executed by the at least one processor, cause the system to:
        generate a set of encryption keys, wherein a public encryption key of the set of encryption keys is generated by:

identifying a set of prime numbers less than a starting value;

for each prime number in the set of prime numbers, calculating a first modulus using the starting value and the respective prime number;

for each prime number in the set of prime numbers, calculating a first difference value between the respective prime number and the respective first modulus to generate a set of first difference values corresponding to the set of prime numbers;

identifying a lowest addend value based on the set of first difference values such that for each respective prime number a second modulus does not equal zero, wherein the second modulus is based on:

a second difference value between the lowest addend value and the respective first difference value, and the respective prime number; and determining the public encryption key based on the starting value and the lowest addend value;

provide the public encryption key to another computing device;

receive an encrypted message from the other computing device, wherein the encrypted message is encrypted using the public encryption key provided; and decrypt the encrypted message using a private encryption key of the set of encryption keys.

16. The system of claim 15, further comprising instructions that, when executed by the at least one processor, cause the system to:

generate the private encryption key based on the public encryption key.

17. The system of claim 15, wherein the private encryption key is based on a next sequential prime number with respect to the starting value.

18. The system of claim 15, wherein the encrypted message is based on RSA encryption.

19. The system of claim 15, wherein the public encryption key is based on a next sequential prime number with respect to the starting value.

20. The system of claim 15, wherein identifying the lowest addend value includes generating a database table sorted by the set of first difference values, the database table including a respective prime number associated with each first difference value in the set of first difference values.

* * * * *